Feb. 19, 1952     F. E. BROWN     2,586,607
MACHINE AND PROCESS FOR COMPOUNDING
RUBBER OR LIKE MIXES
Filed Feb. 14, 1949                                5 Sheets-Sheet 1
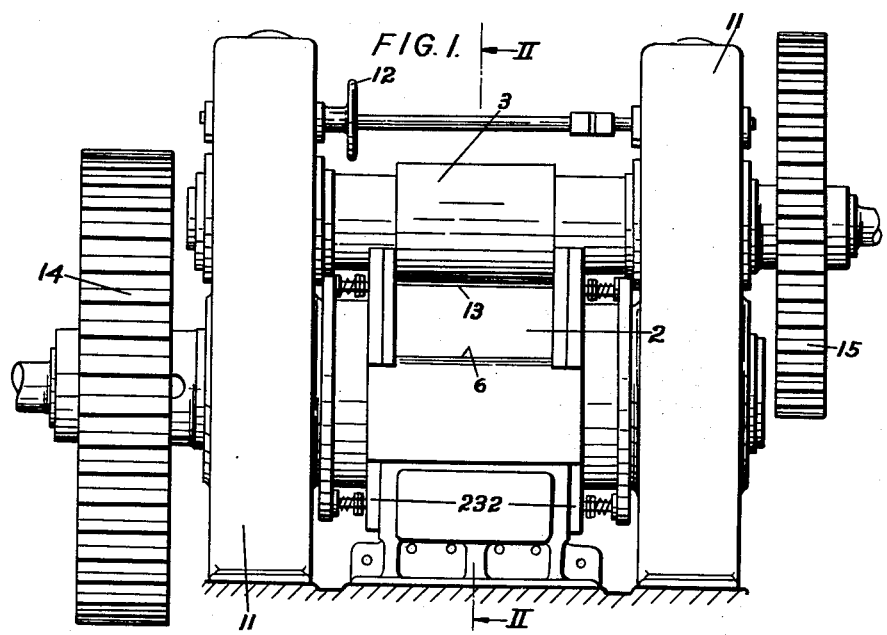
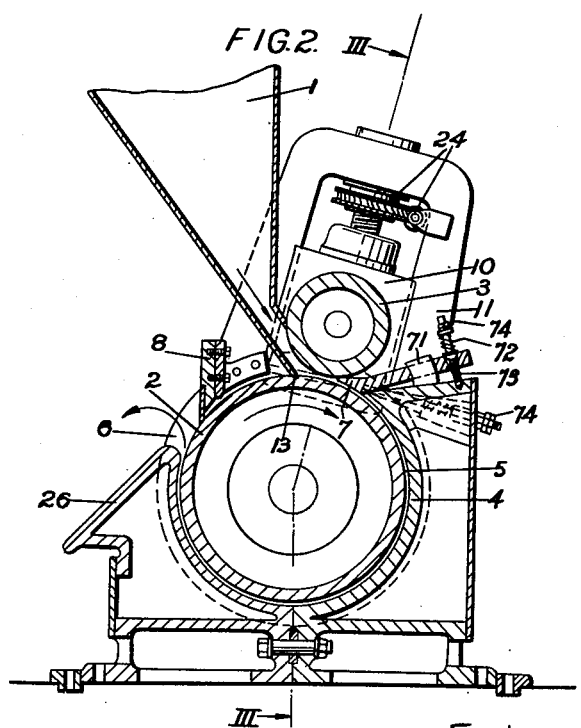
Inventor
Frederick E. Brown
By Emery, Holcombe & Blair
Attorneys Feb. 19, 1952    F. E. BROWN    2,586,607
MACHINE AND PROCESS FOR COMPOUNDING
RUBBER OR LIKE MIXES Filed Feb. 14, 1949    5 Sheets-Sheet 2

*Inventor*

Frederick E. Brown
By Emery, Holcombe & Blair
*Attorneys*

Feb. 19, 1952 F. E. BROWN 2,586,607
MACHINE AND PROCESS FOR COMPOUNDING
RUBBER OR LIKE MIXES
Filed Feb. 14, 1949 5 Sheets-Sheet 3
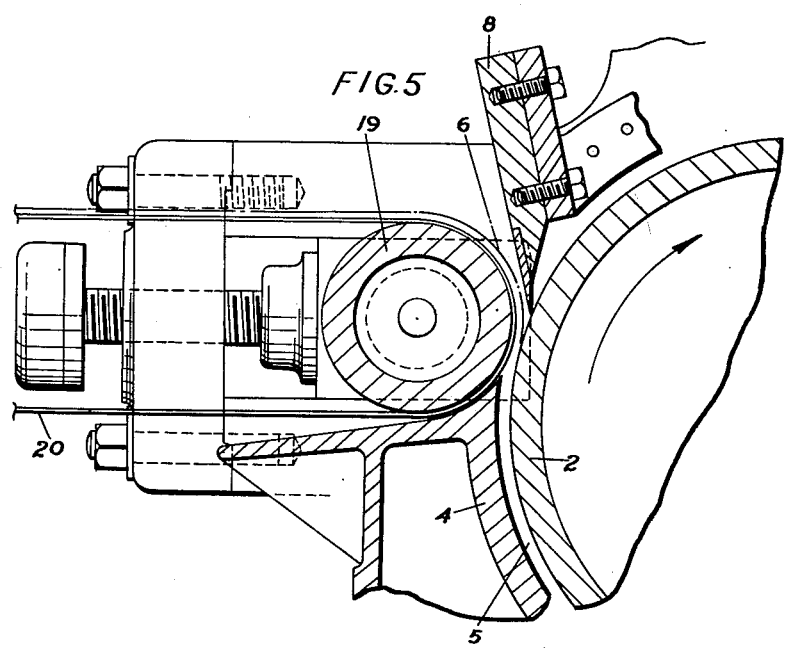
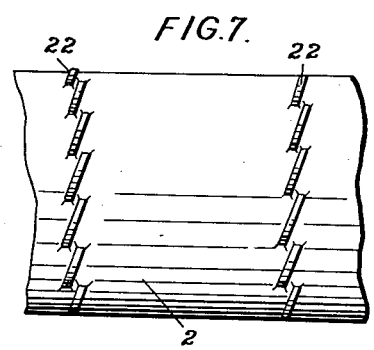
Inventor
Frederick E. Brown
By Emery Halcombe & Blair
Attorneys

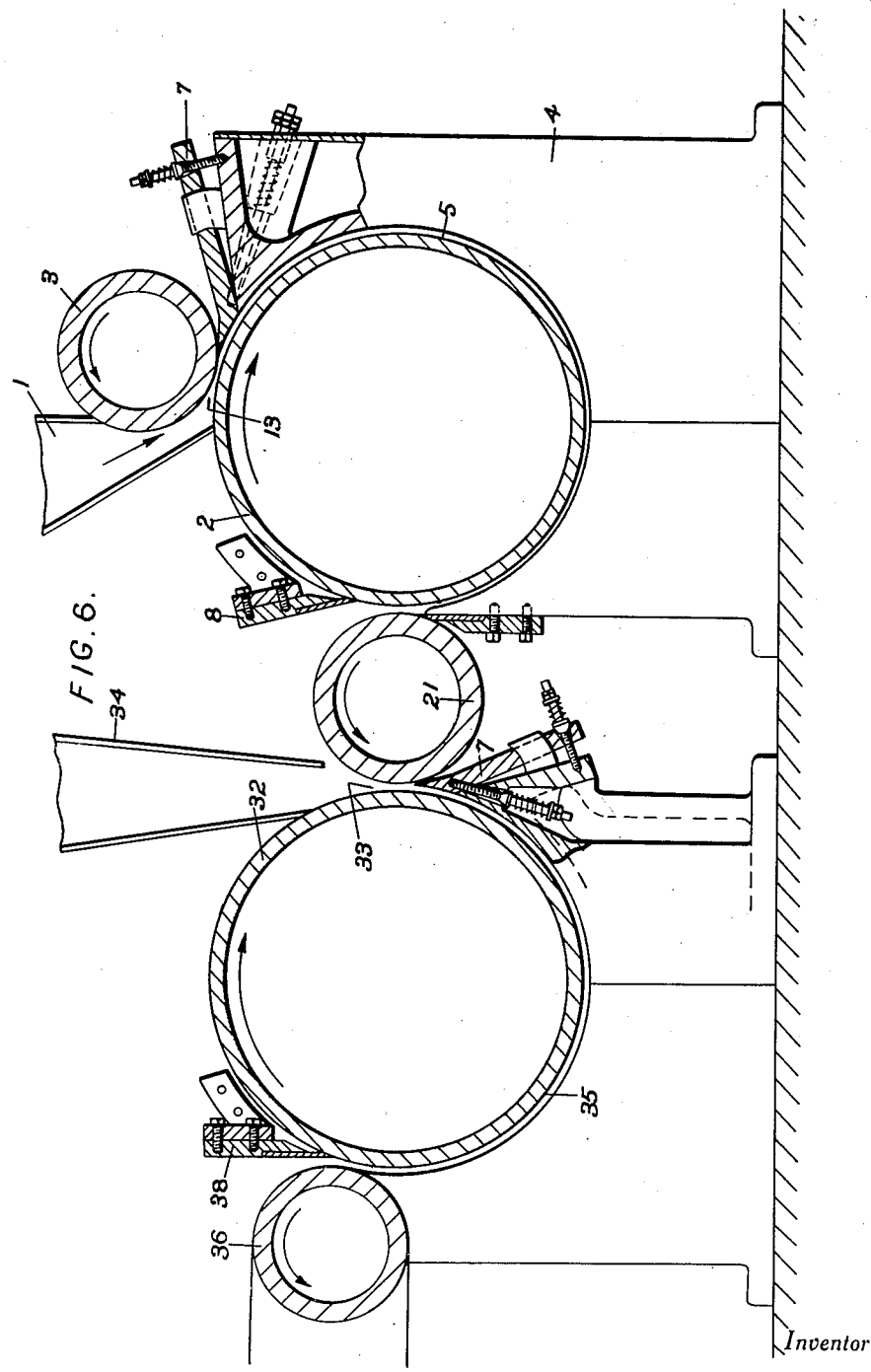

Feb. 19, 1952  F. E. BROWN  2,586,607
MACHINE AND PROCESS FOR COMPOUNDING
RUBBER OR LIKE MIXES
Filed Feb. 14, 1949  5 Sheets-Sheet 5
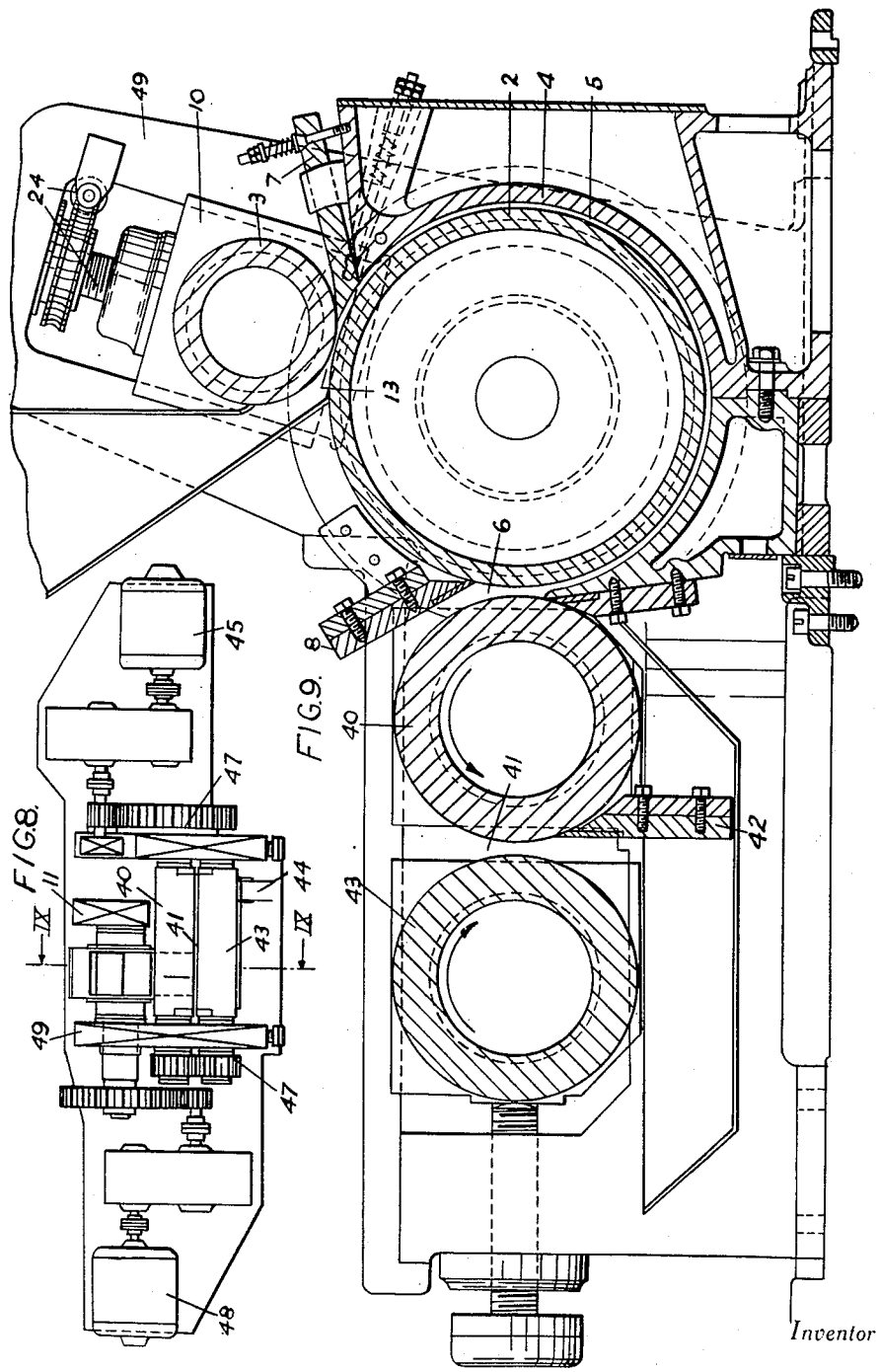
Inventor
Frederick E. Brown
By Emery Holcombe & Blair
Attorneys Patented Feb. 19, 1952

2,586,607

UNITED STATES PATENT OFFICE 2,586,607

MACHINE AND PROCESS FOR COMPOUNDING RUBBER OR LIKE MIXES

Frederick Edward Brown, Hyde, England

Application February 14, 1949, Serial No. 76,251
In Great Britain January 21, 1948

12 Claims. (Cl. 18—2)

This invention relates to the compounding of material of the nature of rubber, that is to say artificial and natural rubber, rubber substitutes, synthetic plastics, linoleum mixes with or without cork, and any substance having similar physical characteristics so far as compounding is concerned.

The common practice in compounding large quantities of rubber at the present time is to put the rubber and various powdered ingredients into an internal mixer of the twin-rotor type. The materials stay in this mixer long enough to mass together, the powders becoming incorporated in the rubber, but the working of the rubber is by no means complete and the compounded material is worked further, as a general rule on a two-roll mill. The internal mixers are costly to maintain owing to wear and are subjected to high peak power loads.

Rubber can be worked by using a machine of the kind described in Patent No. 2,264,237 issued to me, in which large pieces of crude rubber are introduced into a space between a working roller and a casing which extends round the greater part of the circumference of the roller but leaves the top of the roller uncovered. The pieces of rubber are caused to roll and slide over the surfaces bounding this space as they pass through it and on emerging from it they are carried back to its mouth and caused to enter it again by a feed roller which cooperates with the working roller. If powdered ingredients are also added they become mixed with the rubber during the gradual working of the rubber as it repeatedly passes through the working space. The working rollers in these machines are comparatively small, say 1 foot 6 inches to 2 feet in diameter, this size being found to give satisfactory working.

It is an object of this invention to compound materials of the nature of rubber without such expenditure of power as previously required.

It is a further object of this invention to compound material of the nature of rubber in a continuous process without repeated treatment at any stage.

It is a further object of this invention to compound materials of the nature of rubber in a process in which the rubber is first converted into small pieces.

It is a further object of this invention to provide an improved machine for compounding material of the nature of rubber with powdered ingredients.

This invention will best be understood by reference to the accompanying drawings which show machines for compounding material of the nature of rubber. In these drawings:

Figure 1 is an external elevation of a simple machine;

Figure 2 is a section on the line II—II in Figure 1;

Figure 5 shows part of Figure 4 on a larger scale;

Figure 6 is a diagrammatic section of a machine comprising two working rollers in series;

Figure 7 is an elevation of part of a modified working roller;

Figure 8 is a general plan of a machine in conjunction with a two-roll sheeting mill; and Figure 9 is a section on the line IX—IX in Figure 8.

Figure 3:
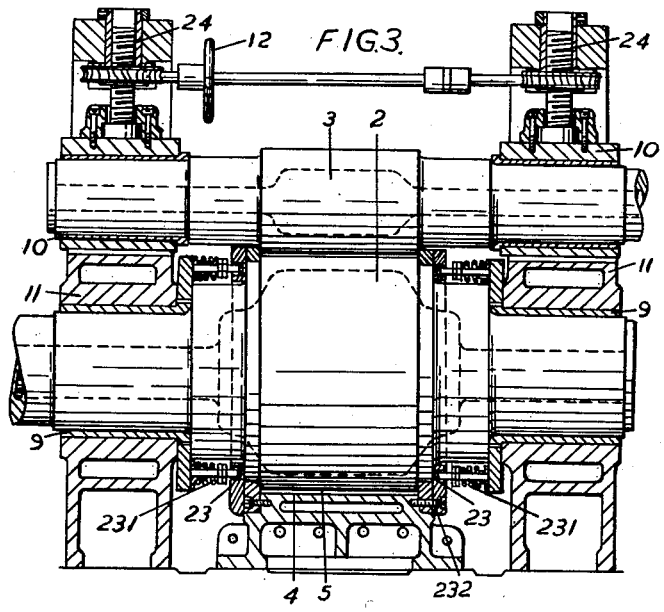
Figure 3 is a section on the line III—III in Figure 2.

The main components of one machine are shown in Figure 2. They are a feed hopper 1, a working roller 2, driven by a motor (not shown), a feed roller 3, a casing 4 concentric with the feed roller, and with it bounding a working space 5, an outlet 6, and a delivery surface 26. Before being fed to the machine, rubber is converted into pellets or similar small pieces. The rubber with powdered ingredients is loaded into the hopper 1 and caused to pass once through the working space 5 by the rotation of the working roller 2, thereupon being transferred to the delivery surface 26. The rubber is forced into the working space by the feed roller 3 cooperating with the working roller 2. The feed roller 3 may be geared to the working roller 2, but preferably is separately driven by a variable-speed motor giving a surface speed between about 1 and 2½ times that of the working roller, the ratio depending on the material handled. A scraper 7 removes material clinging to the feed roller 3, and a scraper 8 at the outlet 6 transfers material from the working roller 2 to the delivery surface 26.

The external appearance of the machine is shown in Figure 1, in which the feed hopper 1 and the scraper 8 have been omitted for the sake of clarity. The rollers are carried in bearings 9, 10 in side frames 11, and the upper bearings 10 may be adjusted simultaneously by a hand wheel 12 and worm-and-screw mechanism 24 to open or close the nip 13 between the feed roller and the working roller. Separate driving gears 14 and 15 are provided for the two rollers. In order to follow the feed roller 3 as the nip 13 is adjusted, the scraper 7 can rock upon a bracket 11, and is held in contact with the bracket by compression springs 72. These surround bolts 73, and the springs may be adjusted by turning nuts 74 until the scraper bears evenly on the feed roller. The rollers 2, 3 and the casing 4 are hollow, and may be heated or cooled as required in the working of material. Axially the working space is closed by sealing rings 23 pressed into close contact with the working roller by springs 231. These sealing rings are carried in outer rings 232.

It is essential that the rubber or the like should be pellets, say ¼ inch cubes or cylinders, or small pieces, say cubes up to 1½ inches on each face or pieces from 2 to 3 inches long cut from sheet ⅜ to ⅝ inch thick. The reason is that the rubber should present as large a surface area as possible to the powders and that the distance from the surface to the centre of any piece should not be so big that the powder cannot be forced to the middle before the compounded material leaves the working space. The best results are obtained when the rubber or the like is supplied to the machine in the form of pellets, say as cubes or cylinders up to about ⅜ inch across. These may be blended with the dry powders, softeners and the like before delivery to the machine, and the blended mixture then fed by the hopper 1 to the nip 13 between the feed and working rollers. The pellets may themselves be produced by being forced into a pellet-forming device as described in my application Serial No. 730,473, now abandoned, and in the process the material will be masticated to some extent. If larger pieces, say up to 1½ inch cubes, are delivered to the machine it is not feasible initially to blend the powders with the pieces, and these materials may therefore be supplied to the nip 13 by separate conveyors replacing the hopper 1 and feeding quantities in correct proportion.

The radial thickness of the working space should be of the order of the smallest dimension of the pellets or small pieces, but the most satisfactory thickness of the working space varies with different types of material. Thus in working rubber it is preferable for the thickness to be in the range ⅜ to ⅝ inch. If the thickness exceeds 1 inch the rubber will not be properly gripped. On the other hand a soft material such as linoleum is preferably compounded in a space about ⅞ inch thick. If the thickness is unduly reduced compounding may still occur, but the output of the machine is lessened.

To enable compounding to take place during a single passage, the working space must be long, that is to say, the diameter of the roller and the fraction of its circumference over which the casing extends must together be large. I find that if the working space extends through about three-quarters of the circumference, the diameter of the working roller should be from 2½ to 4 feet, that is to say, about twice that of the working roller of a machine used for working rubber as disclosed in my said Patent No. 2,264,237.

The axial working length of the roller may however be widely varied according to the capacity required of the machine.

To comply with the foregoing conditions, the working roller 2 in the machine shown in Figure 2 is 36 inches in diameter and 25 inches in axial working length. It is rotated at about 4 R. P. M. by a 150 to 200 H. P. motor and can handle about 3,000–4,500 lbs. of material an hour. According to the nature of the materials the compounded mix will emerge from the working space in sheet form, in sheeted pieces, or as a more or less crumbly mix.

Figure 4:
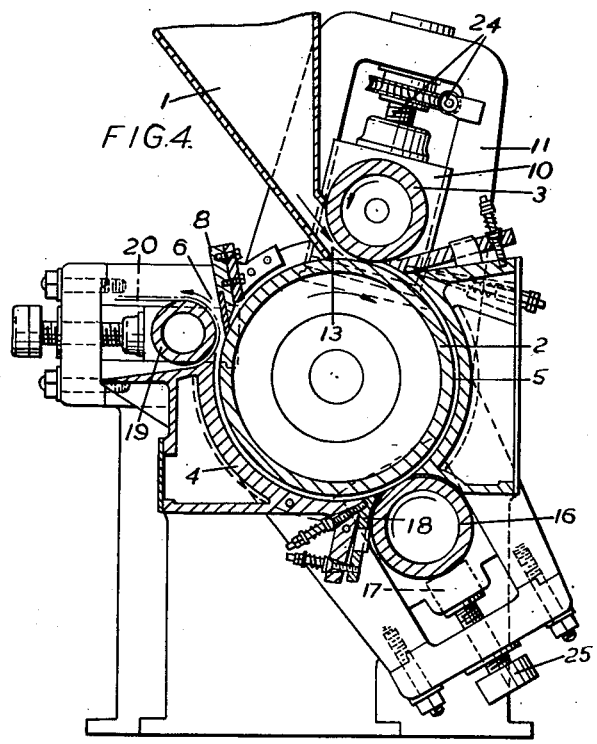
Figure 4 is a vertical section through a modified machine.

The machine shown in Figure 4 is modified in a number of ways. In particular the casing 4 is made non-circular so that the working space 5 becomes thicker towards the outlet. This thickening begins just before a point at which the casing 4 is broken to admit a boosting roller 16. This roller is urged against the working roller 2 by an adjusting screw 25 and a spring buffer 17 which allows the roller 16 to yield according to the flow of material. A scraper 18 is spring-mounted to clean the roller 16. This boosting roller is preferably independently driven and is intermittently accelerated with respect to the working roller 2, thereby increasing the working of the material and the blending of its ingredients. The thickening of the space 5 is particularly suitable for the treatment of material that readily forms a sheet. Such a sheet may conveniently pass from the outlet 6 onto an endless belt conveyor 20, which forms a delivery surface, and which passes round a roller 19.

The material is compounded when it leaves the working space, but it is not fully worked as in a machine as described in my said Patent No. 2,264,237. Any further mixing required may be automatically effected during later working of the material. However, if desired the conveyor 20 may take the material to a similar machine for further mixing action with or without the incorporation of further ingredients. Alternatively a modified machine with two working rollers may be used. Such a machine is shown in diagrammatic section in Figure 6. The rubber or the like is introduced through a hopper 1 to the nip between rollers 2 and 3 as before, and passes from the working space to a transferring roller 21 which acts as a delivery surface receiving the material from the first working roller. This roller 21 forms a nip 33 with a second working roller 32, and further ingredients such as sulphur, accelerators, colouring matter or softeners are supplied to this nip by a hopper 34. The materials are worked in a second working space 35 and transferred to a final delivery roller 36 by a scraper 38.

The compounding machines so far described may be directly combined with a two-roll sheeting mill or with an extruding machine, the material being mechanically fed from the working space of the compounding machine to the mill or extruding machine. Thus the conveyor 20 may deliver the material direct to the feed hopper of an extruding machine such as is described in Patent No. 2,343,529 issued to me, or to a two-roll sheeting mill. When a compounding machine is combined with a sheeting mill, however, it is advantageous for the delivery surface of the compounding machine to be one roller of the sheeting mill.

Figure 8 shows in plan the layout of a compounding machine combined with a sheeting mill, and Figure 9 shows the arrangement in section.

Material discharged at 6 from the working space 5 is transferred by the scraper 8 from the working roller 2 to lap round a roller 40, passing over this roller to a nip 41. The material is supplied to this nip near one end, the roller 40 being about three times the length of the roller 2. Material tends to bank up at this end until a gradual axial movement is set up. At the same time material passes through the nip and is transferred by a scraper 42 to lap repeatedly round a co-operating roller 43. The material becomes a gradually more coherent sheet until at the right-hand end of the rollers (as seen in Figure 8) it is cut by knives beneath the roller, and carried away by a conveyor 44 or as a self-supporting strip. The sheeting mill is driven by a motor 45 and gearing 47 independent from the motor 48 driving the incorporating machine. Save for the side frame 49 which serves both machines, the sheeting mill resembles those in common use, but the two machines constitute a true combination in that the roller 40 of the mill is the delivery surface of the compounding machine. By using this combination it is possible to work large quantities of pelletised rubber to the sheeted condition in a continuous process and to do so with a saving in power in comparison with any existing machines, particularly in comparison with an internal mixer followed by a two-roll mill.

If larger capacity is required than that of machines so far described, the rollers may be made longer. As a result the unsupported length of the feed roller 3 may be such that the load on it causes it to bend and therefore greater power is required to drive it. This can be checked by the provision of ridges on the working roller 2 which break the axial continuity of the material in the nip 13 between the two rollers 2 and 3. Such ridges may be plain or interrupted. Figure 7 shows a working roller carrying ridges 22 made up of short helical lengths.

I claim:

1. A process for compounding material of the nature of rubber with powdered ingredients comprising the steps of supplying said material in small pieces together with the powdered ingredients to a long working space between a working roller and a casing partly surrounding said working roller, passing said material and powdered ingredients once through the working space and transferring the compounded material formed from said initial material and powdered ingredients from the surface of said working roller to a delivery surface.

2. A process according to claim 1 in which the passage of the material through the space is assisted by a positively driven boosting roller having part of its surface lying in a gap in the casing.

3. A process according to claim 2 in which the boosting roller is resiliently mounted to yield as a whole away from the main roller.

4. A process according to claim 1 in which said material is introduced into said working space by means of a feed roller cooperating with the working roller.

5. A process according to claim 1 in which the passage of the material through the space is assisted by a positively driven boosting roller having part of its surface lying in a gap in the casing and accelerated intermittently to increase the rolling of the material in the last part of the mixing space.

6. A process according to claim 1 in which the the surface of the casing is eccentric with respect to the working roller and provides a thickening of the space in the direction of rotation of the working roller.

7. A machine for compounding material of the nature of rubber with powdered ingredients comprising a working roller with its axis horizontal, a casing surrounding said working roller from a point close to the top of said roller round the back and bottom to a point in front of said working roller, said casing and working roller bounding a working space, a feed roller cooperating with said working roller to form a feed nip adjacent the upper edge of said casing, mechanical feed means for supplying material and powdered ingredients to the full axial length of said feed nip, a delivery surface extending away from said casing on the outer side of said working space, and means cooperating with the full axial working length of said working roller to transfer from the surface of the working roller to the delivery surface all compounded material reaching the end of the working space.

8. A machine according to claim 7 in which the casing has an axially extending gap which is filled by part of the surface of a boosting roller cooperating with the working roller.

9. A machine according to claim 8 in which the boosting roller is resiliently mounted to provide automatic adjustment of the nip between it and the main roller, thus avoiding banking up of the material at the inlet side of the nip, and is provided with a scraper to ensure that no material is carried out of the working space.

10. A machine according to claim 7 in which the feed roller is driven independently of the working roller and is adjustable towards and away from the working roller, being provided with a scraper to prevent material lapping around it.

11. A machine according to claim 7 and including a second casing and working roller together bounding a second working space to which the material passes from the delivery surface after leaving the first working space.

12. A machine for compounding and thereafter sheeting material of the nature of rubber, comprising a working roller with its axis horizontal, a casing surrounding said working roller from a point close to the top of said roller around the back and bottom to a point in front of said working roller, said casing and working roller bounding a working space, a feed roller cooperating with said working roller to form a feed nip adjacent to the upper edge of said casing, mechanical feed means for supplying material and powdered ingredients to the full axial length of said feed nip, a first sheeting roller adjacent the front of said working roller, a scraper cooperating with the full axial working length of said working roller to transfer from the surface of said working roller to the surface of said first sheeting roller all compounded material reaching the end of said working space, and a second sheeting roller forming a sheeting nip with said first sheeting roller.

FREDERICK E. BROWN.

REFERENCES CITED

The following references are of record in the file of this patent:

UNITED STATES PATENTS

| Number | Name | Date |
| --- | --- | --- |
| 1,736,582 | Davidson | Nov. 19, 1929 |
| 1,812,538 | Lockert et al. | June 30, 1931 |
| 1,930,736 | Burrell | Oct. 17, 1933 |
| 2,082,753 | Parsons et al. | June 1, 1937 |
| 2,155,303 | Conklin | Apr. 18, 1939 |
| 2,249,307 | Battiste | July 15, 1941 |
| 2,264,237 | Brown | Nov. 25, 1941 |
| 2,316,283 | Piperoux et al. | Apr. 13, 1943 |
| 2,326,927 | Conrad | Aug. 17, 1943 |